March 2, 1937.    LE ROY SMELKER    2,072,411
VEHICLE SEAT
Filed April 29, 1935
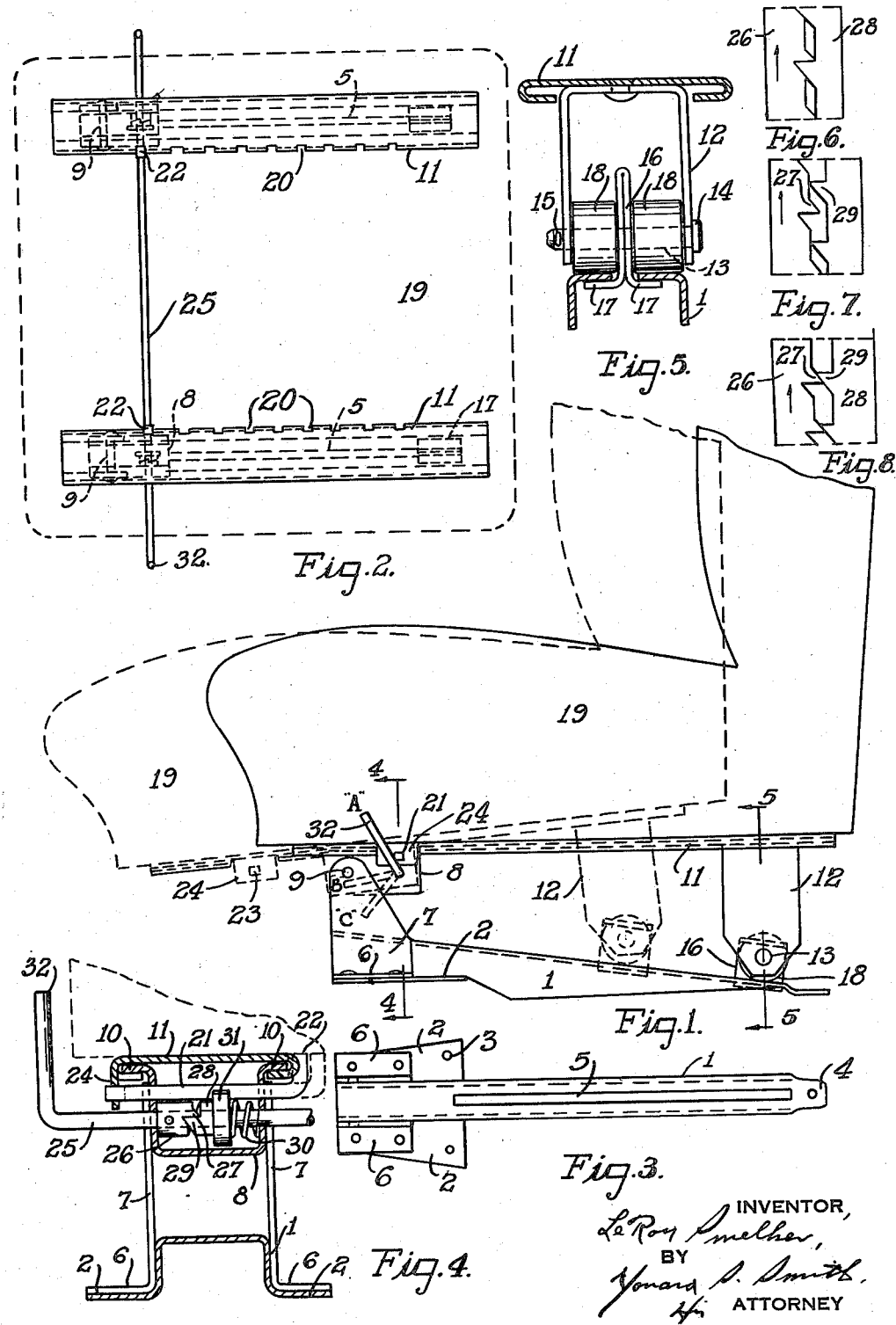

Patented Mar. 2, 1937

2,072,411

UNITED STATES PATENT OFFICE 2,072,411

VEHICLE SEAT

Le Roy Smelker, Dayton, Ohio

Application April 29, 1935, Serial No. 18,941

9 Claims. (Cl. 155—14)

This invention relates to new and useful improvements in vehicle seats, and more particularly to that type of vehicle seat which will slide and tilt at the same time.

It is one of the principal objects of this invention to provide for the type of vehicle seat referred to above, a locking device that may be operated by a person adjacent to, or occupying the seat.

Another object of my invention is to provide such a locking device that will permit the seat to be moved forward and backward without holding the lock in a released position.

It is another object of the invention to provide means for locking the seat in intermediate stages to permit a variable tilt of it.

Another object of the invention is to provide means for making the lock a safety one for a passenger who may not understand the locking mechanism and therefore would not be able to operate it. For example, it is unnecessary for the occupant to manually lock the seat against forward movement from its rear position when the machine comes to a sudden stop, since the snap-in means I have provided automatically locks it in that position.

It is another object of the invention to provide a control rod for the lock that is accessible on either side of the seat.

Other important and incidental objects will be brought out in the following specification and particularly set forth in the subjoined claims.

In the accompanying drawing illustrating my invention, Figure 1 is a side view of the seat adjusting mechanism. Figure 2 is a top plan view of the seat locking mechanism. Figure 3 is a top view of one of the bottom inclined rails. Figure 4 is a cross sectional view taken on the line 4—4 of Figure 1, showing the locking mechanism. Figure 5 is a sectional view taken on the line 5—5 of Figure 1, showing the rear end of the seat elevating guide and roller mechanism. Figure 6 is a view of the lock-bar shifting cam in its locked position, or with the handle in the "A" position in Figure 1. Figure 7 is a view of the lock-box shifting cam when it has disengaged the lock bar from one of the serrations in one of the seat supporting, channel members, or with the handle in the "B" position in Figure 1. And Figure 8 is a view of the lock-bar shifting cam when it has disengaged the lock bar from the hole in the flange on one of the seat-supporting channel members, opposite its serrations, or with the handle in Figure 1 in its "C" position.

Referring to the accompanying drawing for a detailed description of my invention, the numerals 1, 1 designate two channel rails whose top surfaces incline downwardly from front to rear. Formed at their front portions of these channel rails are side flanges 2 provided with holes 3 to receive fastening elements such as screws by which they are attached to the floor of a vehicle.

Each channel rail has its sides formed downwardly a short distance behind its flanges to follow the uneven contour of the floor, terminating at its rear end in a horizontal apertured tail piece 4 to secure it to the floor of the vehicle. However, these channel rails may be formed to rest upon an even floor.

Punched in the upper surface of each channel rail 1 is a slot 5 which extends from a point near its front end above the flanges 2, 2 to a point near its rear end. Secured upon the flanges 2, 2 of each channel rail 1, one on each side of the latter, are the bottom flanges 6, 6 of bracket members 7, 7 respectively. These bracket members terminate above their respective channel rails in portions of reduced width to receive between them a U-shaped member 8. These U-shaped members 8, which are pivotally secured to their respective bracket members by transverse pins 9, are formed at their upper ends with outwardly projecting flanges 10.

Upon the flanges 10, 10 of each pivoted U-shaped member 8 a seat-supporting channel member 11 is slidably supported. The side edges of these channel members 11, 11 are bent to hook shape in cross section, as shown in Figures 4 and 5, to fit loosely over the flanges 10 on the U-shaped channel supports 8, in order that they may be properly guided in their longitudinal movement over the latter.

At their rear ends the seat-supporting channel members 11, 11 are supported by elevating N-shaped bracket members 12, 12 to which they are riveted, as shown in Figure 5. Projecting transversely between the lower ends of each member 12 is a clevis pin 13 formed with a head 14 on one end and at its other end with a hole to receive a cotter pin 15.

Each pin 13 is adapted to be passed through a hole in an inverted T-shaped guide member 16. The latter comprises a metal stamping that is bent upon itself and turned at its free ends to provide two outwardly projecting flanges 17, 17 which are adapted to engage the under surfaces of the rail 1, while its stem portion projects through the slot 5 in said rail.

Mounted on the pin 13 between the legs of the supporting member, one on each side of the doubled leg of the inverted T-member 16, are rollers 18, 18 that rest upon the top of the rail 1.

The two channel members 11, 11 are secured to the bottom of a front vehicle seat 19, so that it may be moved forward and tilted by an occupant, or by one adjacent to it, for the purpose of increasing the clearance between it and the door post to facilitate the passage of a person to and from the rear seat. This adjustment of the pivoted seat is achieved by the travel of the rollers upon the inclined surfaces of the rails 1, 1, as shown by the dotted lines in Figure 1.

For the purpose of locking the seat in any one of its intermediate positions, to permit a variable tilt of it, the following means are provided. One edge of each seat-supporting channel member 11 is formed with serrations or notches 20. Transversely movable through oppositely-disposed holes in the sides of each pivoted U-shaped member 8, is a lock bar 21 having a right-angled notch-engaging end 22. (See Figure 4.) The other end of each lock bar is straight for projection into a hole 23 in a downwardly projecting ear 24 on the front end of each channel member 11.

For the purpose of shifting each lock bar laterally in stages, first to disengage it from the serrated edge of its respective channel member 11, and then from the ear 24 on the opposite edge of the latter, I have provided the following means.

Referring to Figures 2 and 4, the numeral 25 designates a cam actuating rod which projects transversely under the seat 19 through the U-shaped members 8, 8 on both sides of the seat, extending beyond the latter at both ends. Fixedly secured to the rod 25 within each U-shaped member 8, under the locking bar 21 which it carries, is a drum cam 26 whose rim is curved spirally between shoulders 27. Free to slide on the rod 25 opposite the fixed cam 26 is a drum cam 28 formed with shoulders 29 and intermediate spirally curved rim portions that are adapted to be in normal line contact with the curved rim portions of the cam 26 as shown in Fig. 6. Surrounding the rod 25 between each cam 28 and the adjacent side of the U-shaped member 8 is a helical spring 30 that is under sufficient tension to hold the cam 28 in engagement with the cam 26 at all times.

Each lock bar 21, in order that it may be shifted by the cam 28, is formed in its under surface with a notch which an enlarged annular portion 31 on that cam is adapted to enter.

In Figures 1 and 4 the rod 25 is formed with a handle portion 32 that is accessible to the occupant of the seat 19. A handle may be applied to this rod on the other side of the seat if desired.

When the handle 32 is turned to its dotted line, or "B" position in Figure 1, the cam 26 will be rotated by the rod 25 to move the cam 28 along the rod 25 from its "A" position, as that shown in Figure 6, to its "B" position, which is that shown in Figure 7.

When the cam 28 is moved to its "B" position, the lock bar 21 will have been laterally shifted by it a sufficient distance to disengage its end 22 from the serrated edge of the channel member 11. Then, when the handle 32 is rotated further to its "C" position in Figure 1, the cam 28 will be moved still further along the rod 25, against the tension of the spring 30, to its "C" position, or that shown in Figure 8. When the cam 28 comes to that place on the rod 25, it will have drawn the straight end of the lock bar 21 out of the hole 23 in the ear 24 in the channel member 11.

When the lock bars 21 have been thus disengaged from the serrated edges 20 and locking ears 24 on the channel members 11, 11, the seat 19 which they support may be shifted forwardly, and as it moves in this direction its rear end will be tilted upwardly by the inclined rails 1, 1 over which the rollers 18, 18 carried by the rear elevating member 12 travel. Equipped with my locking device, a seat may be moved forwardly or rearwardly without holding the lock in a released position.

Upon turning the handle 32 to its "A" position in Figure 1, the ends 22 of the lock bars 21, 21 may be engaged in desired serrations 20 in the channel members 11, 11 to lock them, and through them, the seat 19 in a selected intermediate position.

In order that the lock may be made a safety one for a passenger who does not understand the locking mechanism, the ears 24, 24 carried by the channel members 11, 11 are constructed of spring metal. Accordingly, when the lock bars 21, 21 are in positions where their ends 22 clear the serrations 20 in those channel members, the straight ends of those bars will project outwardly a sufficient distance to be engaged by the outwardly curved rear edge portions of the ears 24, 24, which will force those bars inwardly a short distance, only to have them sprung into the holes 23 of those ears by the springs 30, 30 when the channel members approach the ends of their rearward movements. Thus, the seat will be automatically locked by these ears against a forward movement when the machine stops suddenly.

Having described my invention, I claim:

1. The combination with a vehicle seat, a rail mounted on the floor of the vehicle and having an inclined top surface, a supporting member pivotally connected to the front end of said rail, a support for said seat slidable over the pivoted member, and an elevating bracket secured at its upper end to the seat support, and slidable at its lower end upon the inclined top surface of said rail.

2. The combination with a vehicle seat, a channel rail mounted on the floor of the vehicle and having an inclined top surface provided with a longitudinal slot, a supporting member pivotally connected to the front end of said rail, a support for said seat slidable over the pivoted member, an elevating bracket secured at its upper end to the rear part of the seat support, rollers carried by the lower end of the elevating bracket for travel over the inclined surface of said rail, an inverted T-member projecting through said slot with its cross portion bearing against the under surface of the rail, and means for pivotally connecting the leg portion of said T-member to the bottom part of the elevating bracket member.

3. The combination with a vehicle seat, a channel rail mounted on the floor of the vehicle and having an inclined top surface provided with an elongated slot, a pair of brackets secured to, and projecting above, the front end of the channel rail, a supporting member pivotally secured between the upper ends of the bracket members, a channel support for said seat slidable over the pivoted member, an elevating bracket secured at its upper end to the under surface of the rear part of the channel support, an inverted T-member having its leg portion projecting through the slot in the rail, with its cross portion bearing against the under surface of said rail, a clevis pin pivotally connecting said inverted T member to the lower end of the elevating bracket member, and a pair of rollers mounted on said pin, one on each side of the leg of the T member, for travel upon the inclined top surface of the channel rail.

4. The combination with a vehicle seat, a rail mounted on the floor of the vehicle and having an inclined top surface, a supporting member pivotally connected to the front end of said rail, a support for said seat slidable over the pivoted member, an elevating bracket secured at its upper end to the rear part of the seat support and slidable at its lower end upon the inclined top surface of said rail, said seat support having a serrated edge, and a lock bar carried by the pivoted member for engagement with the serrated edge of the seat support to lock it in a desired seat tilted position.

5. The combination with a vehicle seat, a rail mounted on the floor of the vehicle and having an inclined top surface, a supporting member pivotally connected to the front end of said rail, a support for said seat slidable over the pivoted member, an elevating bracket secured at its upper end to the rear part of the seat support and slidable at its lower end upon the inclined top surface of the rail, an apertured ear projecting downwardly from the front portion of said seat support, and a spring-pressed locking bar carried by the pivoted member for projection into the aperture of said ear when the latter passes the bar on the return movement of the seat, to automatically lock the latter against forward movement.

6. The combination with a vehicle seat, a rail mounted on the floor of the vehicle and having an inclined top surface, a supporting member pivotally connected to the front end of said rail, a support for said seat slidable over the pivoted member, an elevating bracket secured at its upper end to the rear part of the seat support and slidable at its lower end upon the inclined top surface of the rail, one edge of said support being serrated, an apertured ear projecting downwardly from its other edge, near its front end, a laterally shiftable locking bar carried by said pivoted member, one end of said bar being straight for projection into the aperture in said ear and its other end being bent for engagement with the serrated edge of said slidable support to lock it in its extreme rear position, and manually-operated means for shifting said lock bar laterally to withdraw its ends from their locking positions, and for reversing the movement of said bar to engage its bent end with the serrated edge of the slidable support, after its other end has cleared said ear, to lock the support in an intermediate position.

7. The combination with a vehicle seat, a rail mounted on the floor of the vehicle and having an inclined top surface, a pair of brackets secured to, and projecting above, the front end of said rail, a U-shaped supporting member pivotally secured between the upper ends of said brackets, a support for said seat slidable over the pivoted member, an elevating bracket secured at its upper end to the rear part of the seat support and slidable at its lower end upon the inclined top surface of the rail, one edge of said support being serrated, an apertured ear of spring metal projecting downwardly from the other edge of said support, near its front end, a laterally shiftable locking bar carried by said U-shaped member, one end of said bar beyond one side of the pivoted member being straight for projection into the aperture in said ear, the other end of said bar beyond the other side of said U-member being bent for engagement with the serrated edge of said slidable support, a rotatable rod projecting through said pivoted member, a drum cam having a spiral rim, fixed on said rod, a second drum cam having a spiral rim in engagement with the rim of the first cam and movable on said rod, a helical spring between the second cam and the adjacent side of the U-shaped member, and a shifting connection between the second cam and the lock bar whereby the bottom may be moved when the rod is rotated to disengage its ends from the locking ear and serrated edge on the seat support.

8. The combination with a vehicle seat, a pair of parallel rails mounted on the floor of the vehicle and having inclined top surfaces, supporting members pivotally connected to the front ends of said rails, supports for said seat slidable over the pivoted members, elevating brackets secured at their upper ends to the rear portions of said seat supports and slidable at their lower ends upon the inclined top surfaces of said rail, a lock carried by each pivoted member for its respective slidable seat support, and a rod projecting transversely through both pivoted members, under said seat, for actuating said locks in unison, said rod extending beyond each side of the seat for operation by one occupying, or adjacent to, the seat to unlock it for a tilting movement, or to lock it in an adjusted position.

9. The combination with a vehicle seat, a rail mounted on the floor of the vehicle and having an inclined top surface, a supporting member pivotally connected to the front end of said rail, a support for said seat slidable over the pivoted member, an elevating means secured at its upper end to the rear part of the seat support and slidable at its lower end upon the inclined top surface of the rail, an ear projecting downwardly from the front portion of said seat support, and a yielding locking bar carried by the pivoted member for engagement with said ear when the latter passes the bar on the return movement of the seat, to automatically lock the latter against forward movement.

LE ROY SMELKER.